United States Patent
Chorvath et al.

(10) Patent No.: US 6,465,552 B1
(45) Date of Patent: Oct. 15, 2002

(54) THERMOPLASTIC SILICONE ELASTOMERS EMPLOYING RADICAL CURE

(75) Inventors: Igor Chorvath, Midland; Frances Marie Fournier, Flint; Christopher James Julien, Freeland; Michael Kang-Jen Lee, Midland; Dawei Li, Midland; Jun Liao, Midland; Robert Leo Oldinski, Bay City; Richard Leroy Rabe, Midland; David Joseph Romenesko, Midland; Thomas John Tangney, Midland, all of MI (US); Yongjun Lee, Hiratsuka; Koji Nakanishi, Ichihara, both of (JP)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/845,971

(22) Filed: May 1, 2001

(51) Int. Cl.$^7$ .................................................. C08K 5/13
(52) U.S. Cl. .................... 524/323; 524/349; 524/730; 524/731; 524/862; 525/431; 525/446
(58) Field of Search ................................. 525/431, 446; 524/730, 731, 862, 323, 349

(56) References Cited

U.S. PATENT DOCUMENTS

| | | | |
|---|---|---|---|
| 4,164,491 A | 8/1979 | Itoh et al. | 260/37 |
| 4,500,688 A | 2/1985 | Arkles | 525/431 |
| 4,695,602 A | 9/1987 | Crosby et al. | 524/439 |
| 4,714,739 A | 12/1987 | Arkles | 525/92 |
| 4,803,244 A | 2/1989 | Umpleby | 525/105 |
| 4,831,071 A | 5/1989 | Ward et al. | 524/401 |
| 4,849,469 A | 7/1989 | Crosby et al. | 524/439 |
| 4,891,407 A | 1/1990 | Mitchell | 525/104 |
| 4,970,263 A | 11/1990 | Arkles et al. | 525/92 |
| 5,391,594 A | 2/1995 | Romenesko et al. | 523/212 |
| 5,648,426 A | 7/1997 | Zolotnitsky | 525/100 |
| 6,013,715 A | 1/2000 | Gornowicz et al. | 524/492 |
| 6,153,691 A | 11/2000 | Gornowicz et al. | 524/861 |
| 6,359,071 B1 * | 3/2002 | Watanabe et al. | 525/184 |
| 6,362,287 B1 | 3/2002 | Chorvath et al. | |
| 6,362,288 B1 * | 3/2002 | Brewer et al. | 524/730 |
| 6,361,288 B1 | 7/2002 | Brewer et al. | |

FOREIGN PATENT DOCUMENTS

| | | | |
|---|---|---|---|
| EP | 0 506 465 A2 | 9/1992 | C08L/67/02 |
| EP | 0 651 009 A1 | 5/1995 | C08L/21/00 |
| JP | 62-11897 | 1/1987 | |
| JP | 07-26147 | 1/1995 | |
| WO | 96/01291 | 1/1996 | C08L/21/00 |

OTHER PUBLICATIONS

U.S. application Ser. No. 09/728,920 "Thermoplastic Silicone Elastomers formed from Polyester Resins" Chorvath et al., Dec. 4, 2000.

U.S. application Ser. No. 09/843,906 "Polyolefin Thermoplastic Silicone Elastomers Employing Radical Care" Chorvath et al., Apr. 30, 2001.

* cited by examiner

Primary Examiner—Robert Dawson
Assistant Examiner—Marc S. Zimmer
(74) Attorney, Agent, or Firm—Alan Zombeck

(57) ABSTRACT

Thermoplastic elastomers are disclosed which are prepared by;

(I) mixing,
  (A) a thermoplastic resin comprising more than 50 percent by volume of a polyamide or a polyester resin,
  (B) a silicone base comprising;
    (B') 100 parts by weight of a diorganopolysiloxane gum having a plasticity of at least 30 and having an average of at least 2 alkenyl groups per molecule and
    (B") 5 to 200 parts by weight of a reinforcing filler, wherein the weight ratio of said silicone base to said polyamide or polyester resin is from 35:65 to 85:15,
  (C) a compatibilizer,
  (D) a radical initiator, present in an amount sufficient to cure said diorganopolysiloxane gum, and optionally
  (E) a stabilizer, (II) dynamically vulcanizing said diorganopolysiloxanes gum,
  wherein at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 25%.

42 Claims, No Drawings

THERMOPLASTIC SILICONE ELASTOMERS EMPLOYING RADICAL CURE

FIELD OF THE INVENTION

This invention provides a method of preparing thermoplastic elastomer compositions comprising mixing a filled silicone gum, a compatibilizer, an optional stabilizer, a polyamide resin or a polyester resin and the silicone gum and dynamically vulcanizing the silicone gum via a radical initiator.

BACKGROUND OF THE INVENTION

Thermoplastic elastomer vulcanizates (TPV), represent a known class of thermoplastic elastomers. These materials are prepared by a process known as dynamic vulcanization wherein an elastomer is dispersed in a thermoplastic resin and the elastomer is subsequently cured with the aid of a crosslinking agent and/or catalyst during the mixing process. A number of such TPV systems are known in the art, including some wherein the crosslinked elastomeric component can be a silicone polymer while the thermoplastic component is an organic (i.e., non-silicone) polymer. For example, Arkles, in U.S. Pat. No. 4,500,688, discloses semi-interpenetrating networks (semi-IPN) wherein a vinyl-containing silicone fluid having a viscosity of 500 to 100,000 cS is dispersed in a conventional thermoplastic resin. The vinyl-containing silicone is vulcanized in the thermoplastic during melt mixing according to a chain extension or crosslinking mechanism, which employs a silicon hydride-containing silicone component. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin.

Crosby et al., in U.S. Pat. No. 4,695,602, teach composites wherein a silicone semi-IPN vulcanized via a hydrosilation reaction is dispersed in a fiber-reinforced thermoplastic resin having a high flexural modulus. The silicones employed are of the type taught by Arkles, cited supra, and the composites are said to exhibit improved shrinkage and warpage characteristics relative to systems, which omit the semi-IPN.

Ward et al., in U.S. Pat. No. 4,831,071, disclose a method for improving the melt integrity and strength of a high modulus thermoplastic resin to provide smooth-surfaced, high tolerance profiles when the modified resin is melt-drawn. As in the case of the disclosures of Arkles et al., cited supra, a silicone mixture is cured via a hydrosilation reaction after being dispersed in the resin to form a semi-IPN, and the resulting composition is subsequently extruded and melt-drawn.

U.S. Pat. No. 6,013,715 to Gomowicz et al. teaches the preparation of thermoplastic silicone vulcanizates (TPSiV) wherein a silicone gum (or filled silicone gum) is dispersed in either a polyolefin or a poly(butylene terephthalate) resins and the gum is subsequently dynamically vulcanized therein via a hydrosilation cure system. The resulting elastomers exhibit an ultimate elongation at break of at least 25% and have significantly improved mechanical properties over the corresponding simple blends of resin and silicone gum in which the gum is not cured (i.e., physical blends). This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

EP 651,009A1 to Sumitomo Bakelite Co., published May 3, 1995, discloses a thermoplastic elastomer composition which is prepared by dynamically vulcanizing a mixture comprising an unsaturated organic (i.e., non-silicone) rubber, a thermoplastic resin, an SiH-containing crosslinker, a hydrosilating catalyst and a compatibilizing agent.

U.S. Pat. No. 6,153,691, discloses the preparation of TPSiVs by a condensation cure mechanism. The silicone component employed contains silanol (—SiOH) functionality and is cured with an organohydrido functional crosslinker in the presence of, e.g., an organotin condensation catalyst.

Publication EP 506,465 A2 to Japan Synthetic Rubber Co. discloses thermoplastic elastomers having improved mechanical properties, resistance to heat and oil, and compression set. These systems are prepared by mixing a thermoplastic polyester elastomer with a rubber and dynamically vulcanizing the rubber as these components are mixed. Various stabilizers and compatibilizers may be incorporated in the compositions, but no criticality is ascribed to these optional ingredients. Further, this publication only teaches the preparation of a thermoplastic elastomer from another thermoplastic elastomer and, although silicone rubber is used in one example, the incorporation of a compatibilizer is not suggested.

Thus, although the above cited publications disclose the preparation of thermoplastic elastomer compositions using various thermoplastic resins as the matrix and a silicone phase which is dynamically vulcanized therein, neither these publications teach TPSiV compositions containing a compatibilizer and an optional thermal stabilizer wherein the silicone is cured by a radical reaction.

SUMMARY OF THE INVENTION

The present invention, therefore, relates to a thermoplastic elastomer prepared by
(I) mixing,
(A) a thermoplastic resin selected from
  (A') a thermoplastic resin comprising more than 50 percent by volume of a polyamide resin or
  (A") a thermoplastic resin comprising more than 50 percent by volume of a polyester resin,
(B) a silicone base comprising;
  (B') 100 parts by weight of a diorganopolysiloxane gum having a plasticity of at least 30 and having an average of at least 2 alkenyl groups per molecule and
  (B") 5 to 200 parts by weight of a reinforcing filler,
  wherein the weight ratio of said silicone base to said polyamide or polyester resin is from 35:65 to 85:15,
(C) a compatibilizer,
(D) a radical initiator, present in an amount sufficient to cure said diorganopolysiloxane gum, and optionally
(E) a stabilizer,
(II) dynamically vulcanizing said diorganopolysiloxanes gum,
  wherein said thermoplastic elastomers have an elongation of at least 25% and at least one property of said thermoplastic elastomers selected from tensile strength or elongation is at least 25% greater than the respective property for a corresponding simple blend wherein said diorganopolysiloxanes gum is not cured.

The invention further relates to thermoplastic elastomers, which are prepared by the above method.

DETAILED DESCRIPTION OF THE INVENTION

Component (A) of the present invention is a thermoplastic resin selected from (A') a thermoplastic resin comprising more than 50 percent by volume of a polyamide resin or (A") a thermoplastic resin comprising more than 50 percent by volume of a polyester resin, Component (A') of the present invention is a thermoplastic polyamide resin. These resins are well known by the generic term "nylon" and are long chain synthetic polymers containing amide (i.e., —C(O)—NH—) linkages along the main polymer chain. For the purposes of the present invention, the polyamide resin has a softening point of at least about 25° C. (i.e., below this point, the resin is no longer a thermoplastic). As used herein, "softening point" corresponds to the melting point of the resin when it is at least partially crystalline and corresponds to the glass transition temperature when the resin is completely amorphous. Preferably, the softening point of the polyamide resin is between 25° C. and 275° C., more preferably between 150° C. and 275° C. and most preferably between 175° C. and 265° C. It is preferred that the polyamide resin is dried prior to use, as generally recommended by the manufacturer. This is typically accomplished by passing a dry air or an inert gas stream over as-received resin pellets or powder at elevated temperatures. The degree of drying consistent with optimal ultimate elastomer properties depends on the particular polyamide and other components of the invention and is readily determined by a few simple experiments for the system under consideration.

The polyamide must also be Theologically stable under the mixing conditions required to prepare the TPSiV elastomer, as described infra. This stability is evaluated on the neat resin at the appropriate processing temperature and a change of more than 20% in melt viscosity (mixing torque) within the time generally required to prepare the corresponding TPSiVs (e.g., 10 to 30 minutes in a miniaturized internal mixer) indicates that the resin is outside the scope of the present invention. Thus, for example, a nylon 11 sample (dried at 120° C. for 2 hours) having a m.p. of 198° C. was mixed in a miniaturized internal mixer under a nitrogen gas purge at a process temperature between 210 to 220° C. for about 15 minutes and the observed mixing torque increased by approximately 200%. Such a polyamide resin is not a suitable candidate for the instant method.

Other than the above-mentioned limitations, the polyamide resin can be any thermoplastic crystalline or amorphous high molecular weight solid homopolymer, copolymer or terpolymer having recurring amide units within the polymer chain. In copolymer and terpolymer systems, more than 50 mole percent of the repeat units are amide-containing units.

Examples of suitable polyamides are polylactams such as nylon 6, polyenantholactam (nylon 7), polycapryllactam (nylon 8), polylauryllactam (nylon 12), and the like; homopolymers of amino acids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Preferred polyamide resins are nylon 6, nylon 12, nylon 6/12, nylon 6/69, and nylon 6/6.

It is also contemplated that component (A') can be blended with a non-polyamide, saturated thermoplastic resin such that the polyamide resin (A') comprises more than 50 percent of the blend volume. As in the case of component (A'), this optional resin has a softening point of at least about 25° C., preferably 25° C. to 275° C.

Component (A") of the present invention is a thermoplastic polyester resin having a softening point of at least about 25° C., as in the case of the polyamide resin. Preferably, the softening point of the polyester resin is between about 25° C. and 300° C., more preferably between 150° C. and 300° C. and most preferably between 200° C. and 275° C. As in the case of the polyamide resin described above, the polyester must be rheologically stable under the mixing conditions required to prepare the TPSiV elastomer. It is also preferred that the polyester resin is dried prior to use, as generally recommended by the manufacturer, as described above in connection with the polyamide.

Other than the above-mentioned limitations, the polyester resin can be any thermoplastic crystalline or amorphous high molecular weight solid homopolymer, copolymer or terpolymer having recurring ester units within the polymer chain. In copolymer and terpolymer systems, more than 50 mole percent of the repeat units are ester-containing units.

Examples of suitable polyester resins are homopolymers of polyesters such as poly(butylene terephthalate) (PBT), poly(ethylene terephthalate) (PET), poly(trimethylene terephthalate) (PTT), poly(ethylene naphthalate) (PEN), poly(butylene naphthalate) (PBN) and poly(cyclohexylenedimethylene terephthalate) (PCT); copolymers of polyesters such as poly(ethylene-co-cyclohexane-1, 4-dimethylene) copolyesters (PCTG, PETG), poly[(tetramethylene glycol)-co-(ethylene terephthalate)]. Preferred polyester resins are PBT, PET, PTT, PBN and PEN.

Again, it is contemplated that component (A") can be blended with a non-polyester, saturated thermoplastic resin such that the polyester resin (A") comprises more than 50 percent of the blend volume. As in the case of component (A"), this optional resin has a softening point of at least about 25° C., preferably 25° C. to 300° C.

Component (B) is a silicone base comprising;

(B') 100 parts by weight of a diorganopolysiloxane gum having a plasticity of at least 30 and having an average of at least 2 alkenyl groups in its molecule and (B") 5 to 200 parts by weight of a reinforcing filler, Diorganopolysiloxane gum (B') is a high consistency (gum) polymer or copolymer, which contains at least 2 alkenyl groups having 2 to 20 carbon atoms per molecule. Examples of the alkenyl group include vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl, which are selected such that the diorganopolysiloxane gum (B') has a glass temperature (and/or melt point) which is below room temperature. Preferably, methyl groups make up at least 50, more preferably at least 90, mole percent of the non-unsaturated silicon-bonded organic groups in component (B').

Thus, diorganopolysiloxanes gum (B') can be a homopolymers, copolymer, or terepolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B') include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Although not to be limited by any theory, the present inventors believe the vinyl groups on the diorganopolysiloxane gum participate in the cure chemistry of the silicone base when the thermoplastic elastomer is dynamically vulcanized. One skilled in the art however will recognize that free radical cure of organopolysiloxanes not containing any vinyl groups is possible under certain conditions. Thus, the present inventors also believe vinyl free organopolysiloxanes can be used as the silicone base component. For example, the present inventors believe a polydimethylsiloxane homopolymer, which is terminated with a hydroxy or methyl group at each end of its molecule, would be operable in the present invention utilizing free radical cure chemistry.

Component (B') may also consist of combinations of two or more diorganopolysiloxanes gums. Most preferably, component (B') is a polydimethylsiloxane homopolymer, which is terminated with a vinyl group at each end of its molecule or is such a homopolymer, which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters ×100 of a cylindrical test specimen 2 $cm^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the blends are weak and friable. The gums of the present invention are considerably more viscous than the silicone fluids employed in the prior art. For example, silicones contemplated by Arkles, cited supra, have an upper viscosity limit of 100,000 cS (0.1 $m^2/s$) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Component (B") is a finely divided filler which is known to reinforce diorganopolysiloxane (B') and is preferably selected from finely divided, heat stable minerals such as fumed and precipitated forms of silica, silica aerogels and titanium dioxide having a specific surface area of at least about 50 $m^2$/gram. The fumed form of silica is a preferred reinforcing filler based on its high surface area, which can be up to 700 $m^2$/gram, more preferably a fumed silica having a surface area of 50 to 400 $m^2$/g, and most preferably 200 to 380 $m^2$/g. Preferably, the fumed silica filler is treated to render its surface hydrophobic, as typically practiced in the silicone rubber art. This can be accomplished by reacting the silica with a liquid organosilicon compound, which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When Component (B') is vinyl-functional or hexenyl-functional polydimethylsiloxane, this treating agent is preferably a hydroxy-terminated polydimethylsiloxane.

For the purposes of the present invention, 5 to 200 parts by weight, preferably 5 to 150 and most preferably 20 to 100 parts by weight, of the reinforcing filler (B") are uniformly blended with 100 parts by weight of gum (B') to prepare silicone base (B). This blending is typically carried out at room temperature using a two-roll mill, internal mixer or other suitable device, as well known in the silicone rubber art. Alternatively, the silicone base can be formed in-situ during mixing prior to dynamic vulcanization of the gum, as further described infra. In the latter case, the temperature of mixing is kept below the softening point of resin (A) until the reinforcing filler is well dispersed in the diorganopolysiloxane gum.

Component (C) is a compatibilizer selected from (C') a coupling agent, (C") a functional diorganopolysiloxane or (C'") a siloxane copolymer, at least one compatibilizer being included in the preparation of the thermoplastic elastomer according to the invention.

Coupling agent (C') is a compound having a molecular weight of less than about 800 which contains at least two groups independently selected from ethylenically unsaturated groups having 2 to 20 carbon atoms (e.g.,vinyl, allyl, butenyl, pentenyl, hexenyl, acrylate and methacrylate), epoxy, anhydride, silanol (i.e., —SiOH), silicon hydride (i.e., —SiH), hydroxyl, alkoxy having 1 to 20, preferably from 1 to 10, more preferably from 1 to 4, carbon atoms, carboxyl or oxazoline. The latter group has the structure

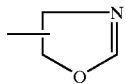

wherein the carbon atoms of the ring may contain one or more substituents selected from hydrocarbon groups having 1 to 4 carbon atoms. The coupling agent can have an organic or siloxane-based skeletal structure as long as it contains at least two of the above-mentioned groups, these being located at terminal positions, along the backbone or both. In the case of siloxane backbones, the above mentioned functional organic groups (i.e., non-silanol or —SiH) are attached to silicon atoms via Si—C bonds (e.g., through a divalent hydrocarbon group such as trimethylene, tetramethylene and dimethylene) or a divalent organic group containing oxygen and/or nitrogen heteroatoms, such as ester, ether or amide. Although these functional groups may be the same, it is generally preferred that at least one of is an ethylenically unsaturated group, preferably vinyl, while at least one other group is selected from the remaining above mentioned groups.

Examples of suitable coupling agents include allyl glycidyl ether, glycidyl methacrylate, 1,2-epoxy-7-octene, 1,2-epoxy-9-decane, 1,2-epoxy-5-hexene, allyl succinic anhydride, vinyloxazolines, vinyloxazoline derivatives such as 2-isopropenyl-2-oxazoline, gamma-glycidoxypropylmethyldimethoxysilane, gamma-glycidoxypyltrimethoxysilane, beta-(3,4-epoxycyclohexyl) ethyltrimethoxysilane, 1,3-phenylene-bis (2-oxazoline), poly(propylene glycol)diglycidyl ether, diglycidyl ether of bisphenol A, tris(2,3-epoxypropy)isocyanurate, low molecular weight of hydride functional polydimethylsiloxanes and silanol terminated polydimethylsiloxanes. The concentration of these coupling agents can be from 0.1 to 10 parts by weight for each 100 parts by weight of the polyamide (A') or polyester (A"), preferably, from 0.5 to 5 parts by weight, more preferably 0.5 to 3 parts by weight.

Component (C") is a functional diorganopolysiloxane having a number average molecular weight of at least about 800, preferably 800 to 50,000, more preferably from 800 to 15,000. This component is a polymer or copolymer in which the organic groups are independently selected from hydrocarbon or halogenated hydrocarbon groups, which contain no aliphatic unsaturation, as described above for component (B'), including preferred embodiments thereof. However, at least two functional groups selected from epoxy, anhydride, silanol, silicon hydride, alkoxy having 1 to 20, preferably from 1 to 10, more preferably from 1 to 4, carbon atoms, carboxyl or oxazoline, as described above, must be present in this polymer or copolymer.

Examples of suitable component (C") include epoxy-functional polydimethylsiloxanes, such as mono (2,3-epoxy) propylether-terminated polydimethylsiloane, epoxypropoxypropyl-terminated polydimethylsiloxane, (epoxycyclohexylethyl)methylsiloxane-dimethylsiloxane copolymers, and (epoxypropoxypropyl)methylsiloxane-dimethylsiloxane copolymers; amine-functional polydimethylsiloxanes, such as aminopropyl-terminated polydimethylsiloxane, aminoethylaminopropyl-terminated polydimethylsiloxane, aminopropyl-grafted polydimethylsiloxane, aminoethylaminopropyl-grafted polydimethylsiloxane; polydimethylsiloxanes containing anhydride groups, such as succinic anhydride-terminated polydimethylsiloxane and succinic anhydride-grafted polydimethylsiloxane; silanol-terminated polydimethylsiloxanes; polydimethylsiloxanes containing carboxyl groups, such as (mono)carboxydecyl-terminated polydimethylsiloxane and carboxydecyl-terminated polydimethylsiloxane; hydride functional polydimethylsiloxanes, such as methylhydrogenpolysiloxane-dimethylpolysiloxane copolymers and dimethylhydrogensiloxy-terminated polydimethylsiloxane; and polydimethylsiloxanes containing oxazoline groups, such as vinyloxazoline grafted polydimethylsiloxane. The concentration of functional diorganopolysiloxane (C") can be from 0.1 to 10 parts by weight for each 100 parts by weight of the polyamide (A') or polyester (A"), preferably, from 0.5 to 5 parts by weight, more preferably 0.5 to 3 parts by weight.

In the case of compatibilizers (C') and (C"), it is sometimes preferred to mix the compatibilizer with the thermoplastic resin at a temperature above the softening point of the resin prior to addition of the silicone base. While not wishing to be held to any theory or mechanism, it is believed that this procedure results in a reaction between the functional groups of the compatibilizer and either the amide, ester or end groups of the resin, thereby maximizing compatibilization efficiency. Alternatively, it is sometimes advantageous to add the compatibilizer to a mixture of the thermoplastic resin and the silicone base. In any event, the preferred technique can be readily determined by routine experimentation.

Component (C'") is a block or graft copolymer comprising at least one diorganopolysiloxane block and at least one organic block selected from polyamide, polyether, polyurethane, polyurea, polycarbonate or polyacrylate when the thermoplastic resin is polyamide (A'). Alternatively, when the thermoplastic resin is polyester (A"), component (C'") is a block or graft copolymer comprising at least one diorganopolysiloxane block and at least one organic block selected from polyester, polystyrene, polyimide, polyurethane, polyacrylate or polycarbonate. For example, this copolymer can have a structure such as AB, $(AB)_n$, ABA, BAB, A-g-B and B-g-A, wherein n is an integer having a value greater than 1, A represents a diorganopolysiloxane block and B represents one of the above mentioned organic blocks. The diorganopolysiloxane block is a polymer or copolymer in which all of the organic groups are independently selected from hydrocarbon or halogenated hydrocarbon groups, which contain no aliphatic unsaturation, these groups being previously described in connection with component (B'). Thus, for example, when the thermoplastic resin is polyamide (A'), this component can be selected from diorganopolysiloxane-polyamide block or graft copolymers; diorganopolysiloxane-polyurethane block or graft copolymers; diorganopolysiloxane-polyurea block or graft copolymers, wherein the diorganopolysiloxane is preferably a polydimethylsiloxane block; and copolymers of poly(alkylene oxide) and diorganopolysiloxane, such as poly(ethylene oxide)-polydimethylsilsoxane-poly(ethylene oxide) block copolymers and poly(propylene oxide)-polydimethylsiloxane-poly(propylene oxide) block copolymers. Similarly, when the thermoplastic resin is polyester (A"), component (C'") can be selected from diorganopolysiloxane-polycarbonate block or graft copolymers or diorganopolysiloxane-polyester block or graft copolymers. In any event, it is preferred that the number average molecular weight of copolymer (C'") is 1,500 to 50,000, more preferably 2,000 to 20,000. The concentration of component (C'") can be from 0.5 to 20 parts by weight for each 100 parts by weight of thermoplastic resin (A), preferably from 0.5 to 10 parts by weight, more preferably 0.5 to 5 parts by weight.

Radical initiator (D) of the present invention is a compound which decomposes at elevated temperature to form radical species. The latter promotes the crosslinking reaction between the alkenyl groups of diorganopolysiloxane gum (B') during the dynamic vulcanization step of the instant method. This component may be illustrated by known azo compounds, carbon compounds and organic peroxy compounds, such as hydroperoxides, diacyl peroxides, ketone peroxides, peroxyesters, dialkyl peroxides, diaryl peroxides, aryl-alkyl peroxides, peroxydicarbonates, peroxyketals, peroxy acids, acyl alkylsulfonyl peroxides and alkyl monoperoxydicarbonates.

For the purposes of the present invention, radical initiator (D) is selected such that the difference between the six-minute half life temperature of the initiator and the process temperature is between −60° C. and 20° C. That is, the following condition is satisfied: −60° C. ≦{T(6)−T(O)} ≦20° C., wherein T(6) represents the temperature (° C.) at which the initiator has a half life of 6 minutes and T(O) represents the processing temperature (° C.) prior to initiator addition (i.e., the actual temperature of the mixture of components (A) through (D)). The value of T(6) is available from the manufacturer of the initiator or can be determined by methods known in the art. After the initiator is introduced, the temperature generally increases slightly as dynamic vulcanization takes place unless intentional cooling is applied. However, such cooling is not generally required unless temperature increases dramatically (e.g., more than about 30° C.).

Specific non-limiting examples of suitable radical initiators include 2,2'-azobisisobutyronitrile, 2,2'-azobis(2-methylbutyronitrile), dibenzoyl peroxide, tert-amyl peroxyacetate, 1,4-di(2-tert-butylperoxyisopropyl)benzene, tert-butyl cumyl peroxide, 2,4,4-trimethylpentyl-2 hydroperoxide, diisopropylbenzene monohydroperoxide, cumyl hydroperoxide, tert-butyl hydroperoxide, tert-amyl hydroperoxide, 1,1-di(tert-butylperoxy)cyclohexane, tert-butylperoxy isopropyl carbonate, tert-amyl peroxybenzoate, dicumyl peroxide, 2,5-dimethyl-2,5-di-(tert-butylperoxy) hexane bis(1-methyl-1-phenylethyl)peroxide, 2,5-dimethyl-2,5-di-(tert-butylperoxy)hexyne-3, di-tert-butyl peroxide, α,α-dimethylbenzyl hydroperoxide and 3,4-dimethyl-3,4-diphenylhexane.

Initiator (D) is used in an amount sufficient to cure diorganopolysiloxane gum (B') and this amount can be optimized for a given system by those skilled in the art using routine experimentation. When the amount is too low, insufficient crosslinking takes place and mechanical properties will be poor. It is readily determined by a few simple experiments for the system under consideration. On the other hand, when excess initiator is added, it is uneconomical and undesirable side reactions, such as polymer degradation, tend to occur. Initiator (D) is preferably added at a level of 0.05 to 6 parts by weight, more preferably 0.2 to 3 parts by weight, for each 100 parts by weight of diorganopolysiloxanes gum (B').

A stabilizer (E) can be added to the mixing step (I) as an optional component. The stabilizer (E) is an organic compound having at least one group of the formula

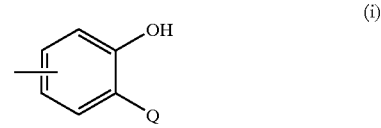

per molecule, wherein Q is a monovalent organic group having 1 to 24 carbon atoms selected from hydrocarbon groups, hydrocarbon groups which optionally contain heteroatoms selected from sulfur, nitrogen or oxygen or halogen-substituted versions of the aforementioned groups. Examples of Q include groups such as alkyl, aryl, alkylaryl, arylalkyl, cycloalkyl and halogen-substituted version thereof, alkoxy groups having 1 to 24 carbon atoms, such as methoxy or t-butoxy; and hydrocarbon groups having 2 to 24 carbon atoms which contain heteroatoms (e.g., —CH$_2$—S—R", —CH$_2$—O—R" or —CH$_2$—C(O)OR", wherein R" is a hydrocarbon group having 1 to 18 carbon atoms). Further, although not explicitly shown in formula (i), it is also contemplated that the benzene ring may additionally be substituted with one or more of the above described Q groups. The residue of the organic compound to which group (i) is chemically bonded is not critical as long as it does not contain moieties which would interfere with the dynamic a vulcanization, described infra. For example, this residue may be a hydrocarbon, a substituted hydrocarbon or a hetero atom-containing hydrocarbon group of the appropriate valence. It is also contemplated that the group according to formula (i) can be attached to hydrogen to form an organophenol. Preferably, the hindered phenol compound has a number average molecular weight of less than about 3,000.

A preferred hindered phenol compound contains at least one group of the formula

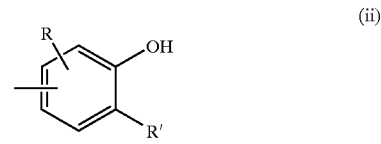

per molecule wherein the benzene ring may be optionally further substituted with hydrocarbon groups having 1 to 24 carbon atoms. In formula (ii), R is an alkyl group having one to four carbon atoms and R' is a hydrocarbon group having 4 to 8 carbon atoms.

Preferably, one to four of the groups shown in structures (i) or (ii) are attached to an organic residue of appropriate valence such that the contemplated compound has a molecular weight (MW) of less than about 1,500. Most preferably, four such groups are present in component (E) and this compound has a molecular weight of less than, about 1,200.

This monovalent (or polyvalent) organic residue can contain one or more heteroatoms such as oxygen, nitrogen, phosphorous and sulfur. The R' groups in the above formula may be illustrated by t-butyl, n-pentyl, butenyl, hexenyl, cyclopentyl, cyclohexyl and phenyl. It is preferred that both R and R' are t-butyl. For the purposes of the present invention, a group according to formula (ii) can also be attached to hydrogen to form a diorganophenol.

Examples of suitable hindered phenols include 1,1,3-Tris (2'-methyl-4'-hydroxy-5'-t-butylphenyl)butane, N,N'-hexamethylene bis(3-(3,5-di-t-butyl-4-hydroxyphenyl) propionamide), 4,4'-thiobis(2-t-butyl-5-methylphenol), 1,3,5-tris(4-tert-butyl-3-hydroxy-2,6-dimethyl benzyl)-1,3,5-triazine-2,4,6-(1H,3H,5H)-trione, N,N'-hexamethylenebis (3,5-di-tert-butyl-4-hydroxyhydrocinnamamide), tetrakis (methylene(3,5-di-tert-butyl-4-hydroxy-hydrocinnamate)) methane, 1,3,5-trimethyl-2,4,6-tris(3,5-di-tert-butyl-4-hydroxybenzyl) benzene, 4,4'-methylenebis (2,6-di-tertiary-butylphenol), 2,2'-thiobis(6-tert-butyl-4-methylphenol), 2,2'-thiobis(4-octylphenol), 4,4'-thiobis(6-tert-butyl-2-methylphenol), 4,4'-thiobis(3,6-di-sec-amylphenol), 2-(4,6-bis(2,4-dimethylphenyl)-1,3,5,-triazin-2-yl)-5-(octyloxy) phenol, 2,4bisoctylmercapto-6-(3,5-di-tert-butyl-4-hydroxyanilino)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate, 1,3,5-tris(4-tert-butyl-3-hydroxy-2,6-dimethylbenzyl) isocyanurate, 2,6-di-tert-butyl-4-methoxyphenol, 2,5-di-tert-butylhydroquinone, 2,5-di-tert-amylhydroquinone, 2,6-di-tert-butylhydroquinone, 2,5-di-tert-butyl-4-hydroxyanisole, 2,6-diphenyl-4-octadecyloxyphenol, 3,5-di-tert-butyl-4-hydroxyanisole, 3,5-di-tert-butyl-4-hydroxyphenyl stearate, bis(3,5-di-tert-butyl-4-hydroxyphenyl) adipate, esters of beta-(3,5-di-tert-butyl-4-hydroxyphenyl)propionic acid with mono- or polyhydric alcohols (e.g., methanol, ethanol, n-octanol, trimethylhexanediol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythrritol, trimethylolpropane, tris(hydroxyethyl)isocyanurate, N,N'-bis(hydroxyethyl)oxalamide, 3-thiaundecanol, 3-thiapentadecanol, 4-hydroxymethyl-1-phospha-2,6,7-trioxabicyclo(2.2.2) octane and esters of beta-(5-tert-butyl-4-hydroxy-3-methylphenyl)propionic acid with mono- or polyhydric alcohols (as above).

Preferred stabilizers of the present invention are tetrakis (methylene(3,5-di-tert-butyl-4-hydroxy-hydrocinnamate)) methane, N,N'-hexamethylenebis{3-(3,5-di-tert-butyl-4-hydroxyphenyl)propionamide} and 1,1,3-Tris(2'-methyl-4'-hydroxy-5'-t-butylphenyl)butane. The most preferred stabilizer is tetrakis(methylene(3,5-di-tert-butyl-4-hydroxyhydrocinnamate))methane.

From 0.05 to 5 parts by weight of stabilizer (E) are employed for each 100 parts by weight of thermoplastic resin (A) and silicone base (B). Preferably 0.05 to 2 parts by weight, more preferably 0.2 to 1 parts by weight, of (E) are added for each 100 parts by weight of thermoplastic resin (A) and silicone base (B).

In addition to the above-mentioned components, amounts of an optional additive (F) can be incorporated in the compositions of the present invention. Preferably, these optional components are added at a level of 0.5 to 40 weight percent based on the total composition, more preferably 0.5 to 20 weight percent. These optional additives can be illustrated by, but not limited to, reinforcing fillers for thermoplastic resins, such as glass fibers and carbon fibers; extending fillers, such as quartz, barium sulfate, calcium carbonate, and diatomaceous earth; pigments, such as iron oxide and titanium oxide; electrically conducting fillers, such as carbon black and finely divided metals; heat stabilizers, such as hydrated cerric oxide; antioxidants; flame retardants, such as halogenated hydrocarbons, alumina trihydrate, magnesium hydroxide and organophosphorous compounds; and other fire retardant (FR) materials such as calcium silicate. The above additives are typically added to the final thermoplastic composition after dynamic cure, but they may also be added at any point in the preparation provided they do not interfere with the dynamic vulcanization mechanism. The above additional ingredients are only used at levels, which do not significantly detract from the desired properties of the final composition.

According to the method of the present invention, the thermoplastic elastomer is prepared by thoroughly dispersing silicone base (B), compatibilizer (C) and if desired, stabilizer (E) in thermoplastic resin (A) and dynamically vulcanizing the diorganopolysiloxane in the base using radical initiator (D). For the purposes of the present invention, the weight ratio of silicone base (B) to thermoplastic resin (A) is greater than 35:65. It has been found that when this ratio is 35:65 or less, the resulting vulcanizate generally has a modulus more resembling the thermoplastic resin than a thermoplastic elastomer. On the other hand, the above-mentioned ratio should be no more than about 85:15 since the compositions tend to be weak and resemble cured silicone elastomers above this value. Notwithstanding this upper limit, the maximum ratio of (B) to (A) for any given combination of components is also limited by processability considerations since too high a silicone base content results in at least a partially crosslinked continuous phase which is no longer thermoplastic. This practical limit is readily determined by routine experimentation and represents the highest level of component (B) which allows the TPSiV to be compression molded. It is, however, preferred that the final thermoplastic elastomer can also be readily processed in other conventional plastic operations, such as injection molding and extrusion and, in this case, the weight ratio of components (B) to (A) should be no more than about 75:25. Although the amount of silicone base consistent with the above mentioned requirements depends upon the particular resin and other components selected, it is preferred that the weight ratio of components (B) to (A) is 40:60 to 75:25, more preferably 40:60 to 70:30.

Mixing is carried out in any device which is capable of uniformly dispersing the components in the thermoplastic resin, such as an internal mixer or a twin-screw extruder, the latter being preferred for commercial preparations. The temperature is preferably kept as low as practical consistent with good mixing so as not to degrade the resin. Depending upon the particular system, order of mixing is generally not critical. However, it is preferred to mix component (D) with (B) together at room temperature before adding this combination to a blend of components (A), (C) and (E) at a process temperature sufficient to initiate dynamic vulcanization. Alternatively, components (B), (C), and optional (E) can be well dispersed in resin (A) before adding component (D) to initiate dynamic vulcanization. As previously mentioned, it is also contemplated that the silicone base can be formed in-situ. For example, the reinforcing filler may be added to a mixer already containing the thermoplastic resin and diorganopolysiloxane gum at a temperature below the softening point of the resin to thoroughly disperse the filler in the gum. The temperature is then raised to melt the resin, the other ingredients are added and dynamic vulcanization is carried out. Optimum temperatures, mixing times and other conditions of the mixing operation depend upon the particular resin and other components under consideration and these may be determined by routine experimentation by those skilled in the art. It is, however, preferred to carry out the mixing and dynamic vulcanization under a dry, inert atmosphere such as dry nitrogen, helium or argon.

As noted above, in order to be within the scope of the present invention, the tensile strength or elongation, or both, of the TPSiV elastomer formed by the method of the present invention must be at least 25% greater than that of a corresponding simple blend. A further requirement of the invention is that the TPSiV has at least 25% elongation, as determined by the test described infra. In this context, the term "simple blend" (or physical blend) denotes a composition wherein the weight proportions of resin (A) and base (B) are identical to the proportions in the TPSiV, but no initiators are employed (i.e., no component D). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 mm/min. At least three such samples are evaluated and the results averaged after removing obvious low readings due to sample inhomogeneity (e.g., such as voids, contamination or inclusions). These values are then compared to the corresponding average tensile and elongation values of a sample prepared from the simple blend composition. When at least a 25% improvement in tensile and/or elongation over the simple blend is not realized there is no benefit derived from the dynamic vulcanization and such TPSiVs are not within the scope of the present invention.

The thermoplastic elastomer prepared by the above-described method can then be processed by conventional techniques, such as extrusion, vacuum forming, injection molding, blow molding, overmolding or compression molding. Moreover, these compositions can be re-processed (recycled) with little or no degradation of mechanical properties.

The composition prepared by the present method can be fabricated into useful elastomeric articles (e.g., heat resistant enclosures) by a variety of conventional operations, such as compression molding, injection molding, blow molding and extrusion. The resulting parts may be used in various applications in transportation, construction, electronic, electrical, communications, consumer packaging, medical, appliance, recreation, entertainment, agriculture, and life science industries. Specific examples include automotive under-the-hood components, such as air ducts, fuel line covers, steering bellows, engine seals, CVJ boots and oil filler seals; automotive body and chassis components, such as weather seals, window seals, light seals and over-slam bumpers; automotive interior components, such as air bag door covers and interior console mats; aircraft components, such as connectors, connector seals, engine seals, fuel line covers, and weather seals; gaskets and parts for dishwashers, washing machines, dryers, vacuum cleaners, curtain walls, and skylights; building, road or bridge expansion joints; residential and commercial door and window weather stripping; packaging for foods, beverages, cosmetics, toiletries, and pharmaceuticals; wire and cable jacketing, connectors, and housings; home filtration, home plumbing or industrial hose; irrigation seals; pipe couplings; spa and pool seals; grips for cutlery, toothbrushes, hand tools and power tools; sporting goods components; kitchen tools; storage containers, lids, and seals; medical syringe plunger tips; blood tube and drug vial stoppers; intravenous kits; baby bottle nipples and pacifiers; defibrillator components and cable jacketing for EKG and ECG monitoring devices; laser surgery pencil components; hand and power tool casing; lawn and garden equipment components; enclosures for telecommunication devices as well as for indoor and outdoor digital display screens; architectural glazing seals, inter alia.

EXAMPLES

The following examples are presented to further illustrate the compositions and method of this invention, but are not to be construed as limiting the invention, which is delineated in the appended claims. All parts and percentages in the examples are on a weight basis and all measurements were obtained at about 23° C., unless indicated to the contrary.

Materials

The following materials, listed alphabetically for ease of reference, were employed in the examples.

BASE 1 is a silicone rubber base made from 68.78% PDMS 1, defined infra, 25.8% of a fumed silica having a surface area of about 250 m$^2$/g (Cab-O-Sil® MS-75 by Cabot Corp., Tuscola, Ill.), 5.4% of a hydroxy-terminated diorganopolysiloxane having an average degree of polymerization (DP) of about 8 and 0.02% of ammonium carbonate.

COMPATIBILIZER 1 is an aminopropyl-terminated polydimethylsiloxane having a viscosity of 30 mPa-s and available as BY 16-203 by Dow Corning Toray Silicones, Chiba, Japan.

COMPATIBILIZER 2 is a copolymer of dimethyl and methyl(3-aminopropyl)siloxane with trimethylsiloxy terminated end groups having viscosity of 2,000 mPa·s and available as BY 16-853 X by Dow Corning Toray Silicones, Chiba, Japan.

COMPATIBILIZER 3 is an epoxy-functional polydimethylsiloxane described as an (epoxypropoxypropyl) methylsiloxane-dimethyl siloxane copolymer having a number average molecular weight of 5,700 and marketed under the trade name EXP-29 by Genesee Polymer Corp., Flint, Mich.

COMPATIBILIZER 4 is a SiH-functional compound consisting essentially of 68.4% MeHSiO units, 28.1% Me$_2$SiO units and 3.5% Me$_3$SiO$_{1/2}$ units and has a viscosity of approximately 29 mPa·s. This corresponds to the average formula MD$_{16}$D'$_{39}$M, in which where M is (CH$_3$)$_3$Si—O—, D is —Si(CH$_3$)$_2$—O— and D' is —Si(H)(CH$_3$)—O—.

COMPATIBILIZER 5 is tris(2,3-epoxypropyl)isocyanurate obtained from Aldrich Chemical Co., Milwaukee, Wis.

INITIATOR 1 is 2,5-dimethyl-2,5-di-(tert-butylperoxy) hexane having a T(6) of 158° C.; Trigonox™ 101, obtained from Akzo Nobel Chemicals Inc., Chicago, Ill.

INITIATOR 2 is bis(1-methyl-1-phenylethyl) peroxide having a T(6) of 154–156° C.; dicumyl peroxide, obtained from Aldrich Chemical Co., Milwaukee, Wis.

INITIATOR 3 is 2,5-dimethyl-2,5-di-(tert-butylperoxy) hexyne-3 having a T(6) of 164° C.; Lupersol™ 130, obtained from Schibley Chemical Co., Elyria, Ohio.

INITIATOR 4 is α,α-dimethylbenzyl hydroperoxide having a T(6) of 195° C.; cumene hydroperoxide, obtained from Aldrich Chemical Co., Milwaukee, Wis.

INITIATOR 5 is 3,4-dimethyl-3,4-diphenylhexane having a T(6) of 254° C.; Perkadox™ 58, obtained from Akzo Nobel Chemicals Inc., Chicago, Ill.

IRGANOX™ 1010 is a hindered phenol stabilizer marketed by Ciba Specialty Chemicals Corporation and described as tetrakis{methylene(3,5-di-tert-butyl-4-hydroxy-hydrocinnamate)}methane.

NYLON 12 is obtained from Aldrich Chemical Co.; Melt point (m.p.) =178° C. PBT is polybutylene terephthalate (ValoX™ 315) obtained from General Electric Corp., Lisle, Ill.; m.p.=232° C.

PDMS 1 is a gum consisting of 99.81 wt % $Me_2SiO$ units, 0.16% MeViSiO units and 0.03% $Me_2ViSiO_{1/2}$ units, wherein Me and Vi denote methyl and vinyl, respectively. Prepared by potassium catalyzed equilibration of cyclic siloxanes wherein the catalyst is neutralized with carbon dioxide. This gum has plasticity of about 150.

(Comparative) Example A1

NYLON 12 (80.0 g) was dried at 120° C. for two hours in a desiccating oven (i.e., a drying system in which hot air was dried over a desiccant bed and then passed through a heated oven containing the sample to be dried in a continuous flow cycle). This resin was then melted at 210° C. at 60 revolutions per minute (rpm) in a Haake System 9000™ miniaturized internal mixer (300 mL bowl) under a dry nitrogen atmosphere using roller blades. IRGANOX™ 1010 (0.24 g) was added and mixed for approximately 3 minutes and then BASE 1 (120.0 g) was mixed in. After 5 minutes, the mixer torque was constant at approximately 1,600 m-g. Mixing was stopped and the resulting physical blend was removed from the bowl.

A sample of the above material was compression molded at 225° C. for 5 minutes under approximately 10 ton pressure (99 KPa) in a stainless steel Endura™ 310-2 coated mold followed by cold pressing for 3 minutes. The tensile properties were measured on dumbbells having a length of 25.4 mm, width of 3.18 mm and a thickness of 1 to 2 mm, according to ASTM method D 412 and at an extension rate of 50 mm/min. At least 3 samples were tested, the results were averaged and are presented in Table A1.

(Comparative) Example A2

Dried (2 hrs/120° C.) NYLON 12, BASE 1 and IRGANOX™ 1010 were mixed according to (Comparative) Example A1. After three minutes, INITIATOR 1 (1.2 g) was added dropwise and the torque increased to a maximum. The run was stopped and the resulting TPSiV was compression molded and tested as before, the results being shown in Table A1.

(Comparative) Example A3

Dried (2 hrs/120° C.) NYLON 12, BASE 1 and IRGANOX™ 1010 were mixed according to (Comparative) Example A. After three minutes, INITIATOR 2 (1.2 g) was added dropwise and the torque increased to a maximum. The run was stopped and the resulting TPSiV was again compression molded and tested, the results being shown in Table A1.

Example A4

Dried (2 hrs/120° C.) NYLON 12, BASE 1 and IRGANOX™ 1010 were mixed according to (Comparative) Example A1. After three minutes, COMPATIBILIZER 1 (3.0 g) was added, at which point the mixer torque was approximately 1,500 m-g. After another 4 minutes, INITIATOR 1 (1.4 g) was added dropwise and the torque increased to 10,500 m-g. The run was stopped and the resulting TPSiV was again compression molded and tested, the results being shown in Table A1.

TABLE A1

| Example | Compatibilizer/ Amount | Initiator/Amount | Tensile Strength [at break] (MPa) | Elongation [at break] (%) | T(6) - T(O) (° C.) |
|---|---|---|---|---|---|
| (Comp.) Ex. A1 | 0 | 0 | 2.6 | 14 | — |
| (Comp.) Ex. A2 | 0 | INITIATOR 1/ 1.2 g | 3.6 | 12 | −52 |
| (Comp.) Ex. A3 | 0 | INITIATOR 2/ 1.2 g | 3.4 | 12 | −55 |
| Ex. A4 | COMPAT. 1/ 3.0 g | INITIATOR 1/ 1.4 g | 6.9 | 53 | −52 | wherein T(6) represents the temperature (° C.) at which the initiator has a half life of 6 minutes and T(O) represents the processing temperature (° C.) prior to initiator addition.

Examples A5–A8

TPSiVs were prepared from NYLON 12, BASE 1 and IRGANOX™ 1010 according to Example A4 wherein the compatibilizer and initiator were varied, as indicated in Table A2. The respective mechanical properties are also presented in this table.

TABLE A2

| Example | Compatibilizer/ Amount | INITIATOR 1 (g) | Tensile Strength [at break] (MPa) | Elongation [at break] (%) | T(6) - T(O) (° C.) |
|---|---|---|---|---|---|
| Ex. A5 | COMPAT. 1/ 2.0 g | 4.0 | 9.1 | 64 | −52 |
| Ex. A6 | COMPAT. 1/ 3.0 g | 4.0 | 8.2 | 60 | −52 |
| Ex. A7 | COMPAT. 2/ 3.0 g | 1.4 | 6.4 | 43 | −52 |
| Ex. A8 | COMPAT. 2/ 3.0 g | 4.0 | 8.9 | 53 | −52 |

Examples A9–A12

TPSiVs were prepared from NYLON 12, BASE 1 and IRGANOX™ 1010 according to Example A4 wherein the compatibilizer and initiator were varied as shown in Table A3. The respective mechanical properties are also presented in this table.

TABLE A3

| Example | Compatibilizer/ Amount | INITIATOR 2 (g) | Tensile Strength [at break] (MPa) | Elongation [at break] (%) |
|---|---|---|---|---|
| Ex. A9 | COMPATIBILIZER 1/ 3.0 g | INITIATOR 2 1.4 g | 8.5 | 75 |
| Ex. A10 | COMPATIBILIZER 1/ 3.0 g | INITIATOR 2 4.0 g | 8.9 | 65 |
| Ex. A11 | COMPATIBILIZER 2/ 3.0 g | INITIATOR 2 1.4 g | 7.6 | 54 |

TABLE A3-continued

| Example | Compatibilizer/ Amount | INITIATOR 2 (g) | Tensile Strength [at break] (MPa) | Elongation [at break] (%) |
|---|---|---|---|---|
| Ex. A12 | COMPATIBILIZER 2/ 3.0 g | INITIATOR 2 4.0 g | 8.8 | 57 |

Example A13

TPSiVs were prepared based on NYLON 12 (72 g) and BASE 1 (108 g), according to the methods of Example A4 using a mixing temperature of 190° C. In this example, 0.2 g of IRGANOX™ 1010 was used. The type of compatibilizer and initiator employed are indicated in Table A4 along with mechanical properties.

TABLE A4

| Example | Compatibilizer/ Amount | INITIATOR 4 (g) | Tensile Strength [at break] (MPa) | Elongation [at break] (%) | T(6) - T(0) (° C.) |
|---|---|---|---|---|---|
| Ex. A13 | COMPAT. 3/ 3.5 g | 1.7 g | 8.2 | 67 | 5 |

(Comparative) Example B1

PBT (80.0 g) was dried at 120° C. for two hours in a desiccating oven and then melted at 240° C. at 60 rpm in a Haake POLYLAB™ miniaturized internal mixer (300 mL bowl) under a dry nitrogen atmosphere using roller blades. IRGANOX™ 1010 (0.14 g) was added and mixed for approximately 3 minutes and then BASE 1 (120.0 g) was mixed in. After 5 minutes, the mixer torque was constant at approximately 2,000 m-g. Mixing was stopped and the resulting blend removed from the bowl. A sample of the above material was compression molded at 240° C. for 3 minutes under approximately 10 ton pressure (99 KPa) in a stainless steel Endura™ 310-2 coated mold followed by cold pressing for 3 minutes. The tensile properties were measured and the averaged results are presented in Table B1.

(Comparative) Example B2

A masterbatch was prepared by adding 180 g of BASE 1 to a Haake POLYLAB™ miniaturized internal mixer (300 mL bowl) under a dry nitrogen atmosphere using roller blades at room temperature and 60 rpm. After 3 minutes, 20 g of INITIATOR 5 were added to the mixer and the masterbatch was homogenized for 15 minutes.

Dried (2 hrs/120° C.) PBT (80 g) was added to the mixer at a set temperature of 240° C., followed by 115 g of BASE 1, as in Comp. Ex. A1. Three minutes after adding BASE 1, the above-described masterbatch (5 g) was added and the torque increased to a maximum of 4,000 m-g. The run was stopped and the resulting TPSiV was compression molded and tested, the results being shown in Table B1.

(Comparative) Example B3

Dried (2 hrs/120° C.) PBT (80 g) was added to the mixer followed by 0.2 g of IRGANOX™ 1010 at a set temperature of 240° C. BASE 1 (115 g) was added and mixed as in Comp. Ex. B2. Three minutes after adding BASE 1, 5 g of the masterbatch described in Comparative Example B2 was added and the torque increased to a maximum 4,000 m-g. The run was stopped and the resulting TPSiV was again compression molded and tested, the results being shown in Table B 1.

Example B4

Dried (2 hrs/120° C.) PBT (80 g) was added to the mixer followed by 0.2 g of IRGANOX™ 1010 at a set temperature of 240° C. BASE 1 (115 g) was added and mixed as in Comp. Ex. B2. After 3 minutes, COMPATIBILIZER 4 (6.6 g) was added to the mixer. After another 3 minutes, 5 g of the masterbatch described in Comp. Ex. B2 was added and the torque increased to a maximum 7,000 m-g. The run was stopped and the resulting TPSiV was again compression molded and tested, the results being shown in Table B1. In Examples B2 to B4, the value of {T(6)–T(0)} was 14° C.

TABLE B1

| Example | Compatibilizer/ Amount | IRGANOX ™ 1010 (g) | INITIATOR/ Amount | Tensile Strength [at break] (MPa) | Elongation [at break] (%) | Maximum Torque (m-g) |
|---|---|---|---|---|---|---|
| (Comp.) Ex. B1 | 0 | 0.14 g | 0 | 1.0 | 18 | 2,000 |
| (Comp.) Ex. B2 | 0 | 0 | INITIATOR 5/ 0.5 g | 1.8 | 6 | 4,000 |
| (Comp.) Ex. B3 | 0 | 0.2 g | INITIATOR 5/ 0.5 g | 2.1 | 12 | 4,000 |
| Ex. B4 | COMPAT. 4/ 6.6 g | 0.2 g | INITIATOR 5/ 0.5 g | 5.3 | 47 | 7,000 |

Example B5–B7

Dried (2 hrs/120° C.) PBT (80 g) was added to the mixer followed by 0.2 g of IRGANOX™ 1010 at a set temperature of 240° C. BASE 1 (115 g) was added and mixed as in Ex. B4. After 3 minutes, varied amounts of COMPATIBILIZER 4 were added to the mixer, as shown in Table B2. After another 3 minutes, 5 g of the masterbatch described in Comp. Ex. B2 were added and the torque increased to a maximum in each case. The resulting TPSiVs were compression molded and tested, the results being shown in Table B2.

TABLE B2

| Example | COMPATI-BILIZER 4 (g) | INITIATOR 5 (g) | Tensile Strength [at break] (MPa) | Elongation [at break] (%) | Maximum Torque (m-g) |
|---|---|---|---|---|---|
| Ex. B5 | 1.1 | 0.5 | 3.6 | 25 | 5,600 |
| Ex. B6 | 2.2 | 0.5 | 4.3 | 33 | 5,800 |
| Ex. B7 | 4.4 | 0.5 | 4.7 | 40 | 6,300 |

Example B8–B9

Dried (2 hrs/120° C.) PBT (80 g) was added to the mixer followed by 0.2 g of IRGANOX™ 1010 at a set temperature of 240° C. BASE 1 (115 g) was added and mixed as in Ex. B4. After 3 minutes, COMPATIBILIZER 4 (6.6 g) was added to the mixer. After another 3 minutes, varied amounts of the masterbatch described in Comp. Ex. B2 were added to provide the initiator content indicated in the third column of Table B3, and the torque increased to a maximum in each case. The resulting TPSiV were compression molded and tested, the results being shown in Table B3.

TABLE B3

| Example | COMPATI-BILIZER 4 (g) | INITIATOR 5 (g) | Tensile Strength [at break] (MPa) | Elongation [at break] (%) | Maximum Torque (m-g) |
|---|---|---|---|---|---|
| Ex. B8 | 6.6 g | 0.25 g | 6.2 | 52 | 7,000 |
| Ex. B9 | 6.6 g | 1.0 g | 6.4 | 64 | 7,000 |

Example B10–B12

Dried (2 hrs/120 ° C.) PBT (80 g) was added to the mixer followed by 0.2 g of IRGANOX™ 1010 at a set temperature of 240° C. BASE 1 (115 g) was added and mixed as in Comp. Ex. B2. After 3 minutes, the compatibilizer(s) shown in Table B4 was/were added to the mixer. After another 3 minutes, 5 g of the masterbatch described in Comp. Ex. B2 were added (to provide 0.5 g of INITIATOR 5 in each case) and the torque increased to a maximum in each case. The resulting TPSiVs were compression molded and tested, the results being shown in Table B4.

TABLE B4

| Example | COMPAT. 4 (g) | COMPAT. 5 (g) | Tensile Strength [at break] (MPa) | Elongation [at break] (%) | Max. Torque (m-g) |
|---|---|---|---|---|---|
| (Comp.) Ex. B10 | 0 | 0.55 g | 9.1 | 19 | 8,000 |
| Ex. B11 | 0 | 2.2 g | 7.4 | 42 | 7,000 |
| Ex. B12 | 1.0 g | 0.5 g | 8.7 | 37 | 7,500 |

From Table B4 it is seen that TPSiV of Comparative Example B10 did not meet the 25% elongation requirements of the invention. However, increasing the level of COMPATIBILIZER 5 to 2.2 g provided the desired mechanical properties. This illustrates the routine experimentation one of ordinary skill in the art can use to arrive at the proper proportions of the components in a given system.

(Comparative) Examples C1–C2

Dried (2 hrs/120 ° C.) PBT (80 g) was added to the mixer, followed by the amount of IRGANOX™ 1010 shown in the second column of Table C1, at a set temperature of 240° C. BASE 1 (115 g) was added and mixed as in Comp. Ex. B2. After 3 minutes, 5 g of the masterbatch containing INITIATOR 3 described in Comp. Ex. B2 were added in each case the torque increased to a maximum. The resulting TPSiVs were compression molded and tested, the results being shown in Table C1. In each case, the value of {T(6)–T(O)} was = –76 ° C.

It was observed that, unlike the compositions of the invention, neither of the formulations was homogeneous. Rather, they exhibited "islands" or "fish eyes" of silicone which were approximately ¼ cm in diameter. Moreover, these islands were noticeably softer than the matrix thermoplastic resin.

TABLE C1

| Example | IRGANOX ™ 1010 (g) | Tensile Strength [at break] (MPa) | Elongation [at break] (%) | Maximum Torque (m-g) |
|---|---|---|---|---|
| (Comp.) Ex. C1 16292-102 | 0 | 1.5 | 6 | 9,000 |
| (Comp.) Ex. C2 16292-103 | 0.2 g | 3.1 | 15 | 8,000 |

That which is claimed is:

1. A method for preparing a thermoplastic elastomer, said method comprising:
   (I) mixing
   (A) a thermoplastic resin selected from
      (A') a thermoplastic resin comprising more than 50 percent by volume of a polyamide resin or
      (A") a thermoplastic resin comprising more than 50 percent by volume of a polyester resin,
   (B) a silicone base comprising
      (B') 100 parts by weight of a diorganopolysiloxane gum having a plasticity of at least 30 and having an average of at least 2 alkenyl groups per molecule and
      (B") 5 to 200 parts by weight of a reinforcing filler, wherein the weight ratio of said silicone base to said polyamide or polyester resin is from 35:65 to 85:15,
   (C) for each 100 parts by weight of said thermoplastic resin, a compatibilizer selected from
      (C') 0.1 to 10 parts by weight of a coupling agent having at least two groups independently selected from epoxy, anhydride, silanol, carboxy, alkoxy, organohydrido or oxazoline per molecule,
      (C") 0.1 to 10 parts by weight of a functional diorganopolysiloxane having at least two groups selected from epoxy, anhydride, silanol, silicon hydride, carboxyl, alkoxy having 1 to 20 carbon atoms or oxazoline per molecule, or
      (C''') 0.5 to 20 parts by weight of a copolymer selected from
         (i) a copolymer comprising at least one diorganopolysiloxane block and at least one block selected from polyamide, polyether, polyurethane, polyurea, polycarbonate or polyacrylate when said resin is said polyamide, or
         (ii) a copolymer comprising at least one diorganopolysiloxane block and at least one block selected from polyester or polycarbonate when said resin is said polyester,
   (D) a radical initiator, present in an amount sufficient to cure said diorganopolysiloxane gum; and (II) dynamically vulcanizing said diorganopolysiloxanes gum,
wherein said thermoplastic elastomers have an elongation of at least 25% and at least one property of said thermoplastic elastomers selected from tensile strength or elongation is at least 25% greater than the respective property for a corresponding simple blend wherein said diorganopolysiloxanes gum is not cured.

2. The method according to claim 1, wherein the weight ratio of said silicone base (B) to said thermoplastic resin is from 35:65 to 75:25, said diorganopolysiloxane (B') is a gum selected from a copolymer consisting essentially of dimethylsiloxane units and methylvinylsiloxane units or a copolymer consisting essentially of dimethylsiloxane units and methylhexenylsiloxane units and said reinforcing filler (B") is a fumed silica.

3. The method according to claim 2, wherein said polyamide is selected from the group consisting of nylon 6, nylon 6/6, nylon 6/69, nylon 6/12 and nylon 12.

4. The method according to claim 2, wherein said polyester is selected from poly(butylene terephthalate), poly(ethylene terephthalate), poly(trimethylene terephthalate), poly(ethylene naphthalate) or poly(butylene naphthalate).

5. The method according to claim 3, wherein the weight ratio of said silicone base (B) to said polyamide resin is 40:60 to 70:30.

6. The method according to claim 4, wherein the weight ratio of said silicone base (B) to said polyester resin is 40:60 to 70:30.

7. The method according to claim 5, wherein said compatibilizer is selected from allyl glycidyl ether, allyl succinic anhydride, epoxy-functional polydimethylsiloxanes, amine-functional polydimethylsiloxanes, succinic anhydride-functional polydimethylsiloxanes, polyamide-polydimethylsiloxane copolymers or poly(alkylene oxide)-polydimethylsiloxane copolymers.

8. The method according to claim 6, wherein said compatibilizer is selected from allyl glycidyl ether, allyl succinic anhydride, triglycidyl isocyanurate, epoxy-functional polydimethylsiloxanes, succinic anhydride-functional polydimethylsiloxanes, poly(dimethyl-methylhydrogen)siloxane copolymer, polycarbonate-polydimethylsiloxane copolymers or polyester-polydimethylsiloxane copolymers.

9. The method according to claim 1 wherein step (I) further comprises the addition of
(E) 0.05 to 5 parts by weight of a stabilizer for each 100 parts by weight of said thermoplastic and said silicone base.

10. The method according to claim 9, wherein the weight ratio of said silicone base (B) to said thermoplastic resin is from 35:65 to 75:25, said diorganopolysiloxane (B') is a gum selected from a copolymer consisting essentially of dimethylsiloxane units and methylvinylsiloxane units or a copolymer consisting essentially of dimethylsiloxane units and methylhexenylsiloxane units and said reinforcing filler (B") is a fumed silica.

11. The method according to claim 9, wherein said polyamide is selected from the group consisting of nylon 6, nylon 6/6, nylon 6/69, nylon 6/12 and nylon 12.

12. The method according to claim 9, wherein said polyester is selected from poly(butylene terephthalate), poly(ethylene terephthalate), poly(trimethylene terephthalate), poly(ethylene naphthalate) or poly(butylene naphthalate).

13. The method according to claim 11, wherein the weight ratio of said silicone base (B) to said polyamide resin is 40:60 to 70:30.

14. The method according to claim 12, wherein the weight ratio of said silicone base (B) to said polyester resin is 40:60 to 70:30.

15. The method according to claim 13, wherein said compatibilizer is selected from allyl glycidyl ether, allyl succinic anhydride, epoxy-functional polydimethylsiloxanes, amine-functional polydimethylsiloxanes, succinic anhydride-functional polydimethylsiloxanes, polyamide-polydimethylsiloxane copolymers or poly(alkylene oxide)-polydimethylsiloxane copolymers.

16. The method according to claim 14, wherein said compatibilizer is selected from allyl glycidyl ether, allyl succinic anhydride, triglycidyl isocyanurate, epoxy-functional polydimethylsiloxanes, succinic anhydride-functional polydimethylsiloxanes, poly(dimethyl-methylhydrogen)siloxane copolymer, polycarbonate-polydimethylsiloxane copolymers or polyester-polydimethylsiloxane copolymers.

17. The method according to claim 9, wherein said stabilizer is a hindered phenol having at least one group of the formula

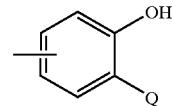

per molecule, in which Q is a monovalent organic group having 1 to 24 carbon atoms selected from
(i) hydrocarbon groups,
(ii) hydrocarbon groups which optionally contain heteroatoms selected from sulfur, nitrogen or oxygen or
(iii) halogen-substituted versions of (i) or (ii),
wherein the benzene ring of said formula may additionally be substituted with at least one Q group.

18. The method according to claim 17, wherein said stabilizer is a hindered phenol having at least one group of the formula

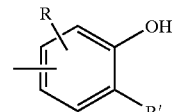

per molecule, wherein R is an alkyl group having one to four carbon atoms, R' is a hydrocarbon group having 4 to 8 carbon atoms and wherein the benzene ring of said formula may be optionally further substituted with a hydrocarbon group having 1 to 24 carbon atoms.

19. The method according to claim 18, wherein said stabilizer is a hinder phenol selected from tetrakis (methylene(3,5-di-tert-butyl-4-hydroxy-hydrocinnamate)) methane, N,N'-hexamethylenebis{3-(3,5-di-tert-butyl-4-hydroxyphenyl)propionamide}, or 1,1,3-Tris(2'-methyl-4'-hydroxy-5'-t-butylphenyl)butane.

20. The method according to claim 19, wherein said stabilizer is tetrakis(methylene(3,5-di-tert-butyl-4-hydroxyhydrocinnamate))methane.

21. The method according to claim 9, wherein said polyamide is selected from nylon 6, nylon 6/6, nylon 6/12 or nylon 12, said polyester is selected from poly(butylene terephthalate), poly(ethylene terephthalate), poly(trimethylene terephthalate), poly(butylene naphthalate) or poly(ethylene naphthalate) and said hindered phenol is selected from tetrakis(methylene(3,5-di-tert-butyl-4-hydroxy-hydrocinnamate))methane, N,N'-hexamethylenebis{3-(3,5-di-tert-butyl-4-hydroxyphenyl)propionamide} or 1,1,3-Tris(2'-methyl-4'-hydroxy-5'-t-butylphenyl)butane.

22. A thermoplastic elastomer prepared according to the method of claim 1.

23. A thermoplastic elastomer prepared according to the method of claim 2.

24. A thermoplastic elastomer prepared according to the method of claim 3.

25. A thermoplastic elastomer prepared according to the method of claim 4.

26. A thermoplastic elastomer prepared according to the method of claim 5.

27. A thermoplastic elastomer prepared according to the method of claim 6.

28. A thermoplastic elastomer prepared according to the method of claim 7.

29. A thermoplastic elastomer prepared according to the method of claim 8.

30. A thermoplastic elastomer prepared according to the method of claim 9.

31. A thermoplastic elastomer prepared according to the method of claim 10.

32. A thermoplastic elastomer prepared according to the method of claim 11.

33. A thermoplastic elastomer prepared according to the method of claim 12.

34. A thermoplastic elastomer prepared according to the method of claim 13.

35. A thermoplastic elastomer prepared according to the method of claim 14.

36. A thermoplastic elastomer prepared according to the method of claim 15.

37. A thermoplastic elastomer prepared according to the method of claim 16.

38. A thermoplastic elastomer prepared according to the method of claim 17.

39. A thermoplastic elastomer prepared according to the method of claim 18.

40. A thermoplastic elastomer prepared according to the method of claim 19.

41. A thermoplastic elastomer prepared according to the method of claim 20.

42. A thermoplastic elastomer prepared according to the method of claim 21.

* * * * *